Patented May 9, 1944

2,348,503

UNITED STATES PATENT OFFICE 2,348,503

VITAMIN PREPARATION AND METHOD OF MAKING SAME

Harden F. Taylor, New York, N. Y., assignor to The Atlantic Coast Fisheries Company, New York, N. Y., a corporation of Maine No Drawing. Application August 23, 1941, Serial No. 408,092

14 Claims. (Cl. 167—81)

This invention relates to vitamin preparations containing labile water-soluble and preferably acid vitamins, and to the method of making the same. More particularly, this invention relates to substantially dry vitamin preparations in any suitable form, such as beadlets or molded products, containing a water-soluble oil-insoluble and preferably acid vitamin and preferably also an oil-soluble vitamin, as well as to the method of making the same.

In Patents Nos. 2,183,053 and 2,218,591, there are disclosed free-flowing vitamin preparations, such as beadlets, molded forms, etc. and comprising a gelable colloid (specifically gelatin) matrix having discrete particles of an oil- or fat-soluble vitamin-containing liquid dispersed in said matrix and completely imprisoned or surrounded thereby, whereby no free vitamin-bearing liquid is present on the exterior surfaces of the product.

In Patents Nos. 2,218,591 and 2,218,592, there are disclosed vitamin preparations of the type previously mentioned and containing a plasticizer which, in addition to maintaining the accessibility of the vitamin in the matrix of the preparation to the digestive tract, also protects the vitamins from adverse effects upon exposure to air for appreciable periods of time.

In vitamin preparations of the type previously mentioned, it is desirable to also incorporate as a group one or more of the labile oil-insoluble solid water-soluble and preferably acid vitamins.

For the sake of brevity and convenience, this invention will be described specifically with reference to vitamin preparations in which the gelable colloid matrix is gelatin and the solid water-soluble and oil-insoluble acid vitamin is vitamin C (ascorbic acid), although it is to be understood that the invention is not restricted thereto, as will be more particularly pointed out hereafter.

In one embodiment described in the previously-mentioned Patents Nos. 2,183,053, 2,218,591 and 2,218,592, the liquid containing the oil- or fat-soluble vitamin (fish oil) is emulsified in an aqueous solution of gelatin (with or without a plasticizer of the type previously mentioned) maintained at an elevated temperature, the concentration of the gelatin being such that upon cooling a firm gel will be obtained in a relatively short period of time. The resulting emulsion, while at the elevated temperature, is then subdivided into the desired form and thereafter caused to form a firm gel, such as by cooling. Finally, the product is dried.

Ascorbic acid (vitamin C) is characterized by the following properties:

(1) It is freely soluble in water but not in oil;
(2) In solution it is a strong acid;
(3) It is a strong reducing agent easily oxidized and, when oxidized, loses its therapeutic value.

During the course of my experimentation, I found that when ascorbic acid in a quantity to provide a useful amount in the final product was dissolved in water and the solution added to the proper quantity of gelatin or gelatin solution, the pH of the gelatin was reduced to such a degree that the gelatin lost its power to gel or did not gel satisfactorily. Thus, when the liquid containing the oil- or fat-soluble vitamin was subsequently emulsified in the gelatin solution containing the ascorbic acid, the emulsion would not set to a firm jelly nor dry satisfactorily. In addition, the product darkened, indicating a probable oxidation of the ascorbic acid.

The undesirable features mentioned in the preceding paragraph are also obtained when ascorbic acid is added to an emulsion (with or without a plasticizer) of the type previously mentioned.

Ascorbic acid is oxidizable in alkaline or neutral solutions, especially when heated. It is protected from oxidation at low pH, but, as acidity diminishes and alkalinity increases, ascorbic acid becomes more and more rapidly oxidizable, so that at some point of the pH it becomes quite impossible to preserve it if exposed to oxidation at all.

Due to the properties of gelatin and ascorbic acid, I found that, in order to incorporate ascorbic acid in gelatin to produce the preparation contemplated by this invention, it is necessary to establish in the continuous phase of the solution of the gelatin or the continuous phase of the emulsion a pH at which the gelatin would not lose its power to gel and the labile ascorbic acid would be stable for practical purposes. The establishment of the required pH can be secured by the addition of an appropriate alkaline substance.

My experiments have shown that many alkaline substances may be used in this invention. Sodium, potassium, calcium and magnesium hydroxides have been found to give satisfactory results. Calcium hydroxide in some cases is preferable to the others, though magnesium hydroxide seems almost as satisfactory. The more potent alkalis, such as sodium and potassium, are very powerful hydrolyzing agents and, while they may be used, they are not so desirable in some results as those of the bi-valent alkaline earths, such as calcium and magnesium. In the claims, the expression "alkaline substance" is intended to cover generically the alkaline substances hereinbefore mentioned.

Entirely apart from the establishment of the required pH as previously mentioned, the results are also influenced by the manner of establishing this pH. I have found that the best results are secured when the ascorbic acid and alkaline substance are introduced into the liquid mass (solution or emulsion containing gelatin) in such a manner as to circumvent the access of oxygen thereto and prevent them from combining prior to the introduction into and imprisonment by the solution or emulsion, as the case may be.

Generally, when a product containing a water-soluble and preferably acid vitamin and also an oil- or fat-soluble vitamin is desired, the method contemplated by this invention comprises suspending or intimately mixing small dry particles of ascorbic acid and small dry particles of an alkaline substance in the oil- or fat-soluble vitamin-bearing oil, i. e. fish oil or vitamin concentrate containing vitamin A or vitamin D or both A and D. The resulting suspension is added to and dispersed or emulsified in a previously formed gelatin solution, with or without a plasticizer, and maintained at a sufficiently elevated temperature so that the mass is a viscous liquid. Subsequently, the resulting polyphase emulsion or dispersion, while still at the elevated temperature, is sub-divided into the desired shape and form. After sub-division, the subdivided portions are chilled and the composition sets to form a firm gel or jelly.

The ascorbic acid and the alkaline substance, which are suspended in the oil- or fat-soluble vitamin-bearing oil, are in the normally dry state and are reduced to the desired particle size in any convenient manner, such as, for example, by powdering, grinding, etc.

The suspension of the dry particles of ascorbic acid and dry particles of alkaline substance in the oil- or fat-soluble vitamin-bearing oil may be effected by use of appropriate agitators. Preferably, the ascorbic acid and alkaline substance are reduced to the desired particle size and suspended by grinding the same, either together or separately as hereafter described, in the oil- or fat-soluble vitamin-bearing oil.

According to one embodiment of the method, small dry particles of ascorbic acid and small dry particles of an alkaline substance are suspended in the oil- or fat-soluble vitamin-bearing oil, i. e. fish oil or vitamin concentrates (vitamin A or vitamin D, or both A and D). The resulting suspension is added to and emulsified in a previously formed gelatin solution, with or without a plasticizer, and maintained at a sufficiently elevated temperature so that it is a viscous liquid. In the preferred form of this embodiment, the oil- or fat-soluble vitamin-bearing oil containing the particles of ascorbic acid and alkaline substance suspended therein is led through a tube into the warm gelatin solution (with or without a plasticizer) and under the surface thereof while a stirring agitator disperses and emulsifies the oil- or fat-soluble vitamin-bearing oil suspension into the gelatin solution. Subsequently, the resulting polyphase solution, while still at the elevated temperature is subdivided into the desired shape and form. After sub-division, the sub-divided portions are chilled and the composition sets to form a firm gel or jelly.

According to another embodiment of this invention, the introduction of the ascorbic acid and the chosen alkaline substance is accomplished by adding them both to the same lot of oil- or fat-soluble vitamin-bearing oil which is to be emulsified in the gelatin solution. In this embodiment, a small portion of the total oil- or fat-soluble vitamin-bearing oil to be emulsified is taken and into it is suspended both the dry alkaline substance and the dry ascorbic acid, as previously mentioned, the oil and the dry powders being in such proportions that the suspension is a rather thick mass approaching the consistency of a paste. With such a consistency, the tendency of the dry powders to separate out by sedimentation is minimized. This dense suspension is then directly dispersed in a previously-formed aqueous solution of gelatin, with or without a plasticizer, and maintained at an elevated temperature, and the remaining portion of the oil- or fat-soluble vitamin-bearing oil which does not contain any dry suspended substance is thereafter dispersed. The resulting polyphase dispersion, while still at an elevated temperature, is sub-divided and treated as previously described.

The preferred procedure contemplates withdrawing two small portions of the oil- or fat-soluble vitamin-bearing oil, the aggregate of all three portions being the total amount to be emulsified into the aqueous gelatin solution. Into one of these small portions is mixed and suspended dry ascorbic acid, and into the other is mixed and suspended the selected dry alkaline substance, for example, calcium hydroxide. Each of these suspensions is then separately dispersed into the gelatin solution maintained at an elevated temperature. Thereafter, the main body of the oil- or fat-soluble vitamin-bearing oil, containing no suspended dry particles, is dispersed in the resulting gelatin solution. Immediately after the introduction of the three lots of oil- or fat-soluble vitamin-bearing oil and the dispersion thereof in the gelatin solution, there results a polyphase emulsion containing three kinds of suspended droplets of oil: first, the oil- or fat-soluble vitamin-bearing oil having no suspended particles; second, droplets of oil- or fat-soluble vitamin-bearing oil containing suspended dry particles or ascorbic acid but no alkali; and finally, droplets of oil- or fat-soluble vitamin-bearing oil containing the suspended particles of alkaline substance but no ascorbic acid. This polyphase emulsion, while at an elevated temperature, is formed or sub-divided into the desired shape and form of the product, and thereafter the sub-divided portions are chilled to form a firm gel or jelly.

Each of the previously-described polyphase emulsions is characterized by a relatively high concentration of gelatin. As a consequence, it is a viscous liquid at an elevated temperature and upon cooling sets to form a firm gel or jelly.

When the ascorbic acid and the alkaline compound are suspended in the oil as previously described, all of the air or oxygen existing among and between the powdered or crystalline particles of ascorbic acid and the dry alkaline substance is driven out and is replaced by the oil. The oil then surrounds and protects each and every crystal or particle of the dry powders and continues to protect them until it is itself dispersed into the gelatin emulsion.

The dry ascorbic acid and the dry alkaline substance, ground or dispersed in the solid dry condition in the oil- or fat-soluble vitamin-bearing oil, do not react or interact because, first, the necessary water is not present for the reaction and, second, because the individual particles of the solid acid and the solid alkaline substance do not come in contact with one another but are kept apart by the oil.

I do not know the precise reaction which takes place in the final polyphase emulsion. It may be possible, though I have not proved it, that eventually the dry powdered ascorbic acid and the alkaline compound find their way through the interfaces between droplets of oil and the aqueous gelatin continuous phase, dissolve in the latter, and chemically react to form, say, the alkali-ascorbate, but by the time this happens or while it is happening the product has been successfully formed into the desired shape, cooled, and gelled. It may also be possible, though again I have not proved this, that the solid particles of alkali and acid may remain undissolved and suspended in the droplets of oil. Since the pH of the gelatin phase may be found by electromatic titration to have been changed from that which characterized the solution before the incorporation of the oil, it appears highly probable that at least some of the acid and alkali has passed from the oil droplets into the aqueous phase. It may be presumed that this transfer from one phase to another is not complete, but, even if some of the solid phase does remain in the oil, it is immaterial to the final result because such particles would be totally and permanently excluded from any contact with oxygen and therefore to deterioration.

It is to be understood that the invention is not limited in any way to any theory. The fact is that, upon the addition to and dispersion of the suspension or suspensions hereinbefore described in a gelatin solution, with or without a plasticizer, the pH of the final emulsion is one at which the labile water-soluble vitamins are stable and the gelling properties of the gelatin are not sufficiently impaired, if at all, to interfere with the successful practice of the method.

The gelatin which may be used in this invention is not restricted to any particular species. Any food gelatin may be used. Highly satisfactory results are obtained if a gelatin which forms an aqueous solution (with or without a plasticizer) having a pH of about 4.7 is used.

The amount or potency of the ascorbic acid and oil- or fat-soluble vitamin-bearing oil, i. e. fish liver oil containing vitamin A or the vitamin concentrates A and D, is based on the vitamin potencies desired in the finished product. It is to be understood that the quantity of fish liver oil must be low enough to be fully dispersed in the aqueous gelatin solution without becoming a continuous phase and without exuding liquid oil in the final product.

The relative proportions of ascorbic acid and alkaline substance employed in the process are such that, if the alkaline substance and the ascorbic acid were dissolved in the aqueous phase of the gelatin solution, the resulting pH (regard being had for the buffing effect of the gelatin) would not materially inhibit the gelling power of the gelatin nor deleteriously affect the ascorbic acid to any practical degree.

The precise range of pH of the final polyphase emulsion which will produce satisfactory products depends on various factors and may be determined empirically. With gelatin at approximately its isoelectric point (about pH 4.7, at which pH it gels and otherwise behaves quite satisfactorily), satisfactory gelling thereof can be obtained even if the pH is reduced to approximately 3.5. If the pH is elevated too much, the labile acid vitamins may in time become oxidized and their biological efficacy may be impaired. There is no sharp line of demarcation in terms of pH above which the labile acid vitamins are destroyed and below which they are stable. Also, it is a fact that stability of the labile acid vitamins is influenced by other factors, such as moisture, light, heat, etc. It is, therefore, not possible to express in exact terms of pH the upper limits of stability of the acid vitamins. As has been previously stated, the zone of pH within which the whole process may be successfully and reliably carried out in practice lies within the region in which the gelatin does not lose its gelling power (which is around a pH of 3.5 to 4) and the region in which the acid vitamins begin to lose stability (which is in the neighborhood of a pH of about 5.5, 5.75, or indeed 6). The preferred range of pH is from about 3.5 to about 4.8.

According to this invention, the pH is subject to control by the relative amounts of acid vitamin and alkaline substance. For example, if calcium hydroxide is added in stoichiometric equivalent to the ascorbic acid, the pH will not be altered very much, if any.

In the following table, there are disclosed results of a series of illustrative satisfactory experiments indicating the relationship between the amounts of calcium hydroxide and of ascorbic acid, and the resulting pH of the emulsion:

|   | Ratio of calcium hydroxide actually used to theoretical amount required | pH |
|---|---|---|
| 1 | 1.21 | 5.32 |
| 2 | 1.00 | 4.80 |
| 3 | .91 | 4.20 |
| 4 | .72 | 3.60 |

The polyphase emulsion produced as previously described is formed into sheets, ribbons, rods or individual units of divers predetermined shapes and forms according to the nature and use of the preparation. It may be formed into dry units consisting of beadlets or molded products of any shape or form, such as pellets, tablets, etc., by any of the procedures for forming the desired dry units from the polyphase emulsions set forth in Patents Nos. 2,183,053, 2,218,591 and 2,218,592, as desired.

In the preferred method of making the desired shapes or forms, the polyphase emulsion, while still at an elevated temperature, is sub-divided into the desired individual shapes or forms and the sub-divisions subjected or permitted to cool, whereby they gel. After gelling, the gelled subdivisions are introduced into a drier and subjected to air or any inert gas, such as carbon dioxide or nitrogen, for a period of time sufficient to dry the product to the degree desired. If desired, the drying gas may be at an elevated temperature.

Though the invention has been specifically described with respect to ascorbic acid, the invention is not limited thereto. The same principles may be employed in the adding of other solid water-soluble acid vitamins, such as nicotinic and pantothenic acids, alone or in combination with each other, or in combination with ascorbic acid, as desired.

Likewise, since other labile solid water-soluble vitamins, i. e. nicotinic acid amide, thiamin chloride (vitamin B₁) or riboflavin (vitamin G) are well known to be more stable when the pH is on the acid side, it is possible to incorporate such vitamins which are not acids in conjunction with ascorbic acid or other acid vitamins in the dry condition into the vitamin-bearing oil as previously explained, or by adding them directly to the gelatin emulsion or polyphase emulsion.

In a similar manner, all of the solid water-soluble vitamins, including, for example, pyridoxine (vitamin B₆) may be included. If alpha-tocopherol (vitamin E) is desired to be introduced, since it is oil-soluble, it may be dissolved directly in the fish liver oil.

In the foregoing description, the preferred embodiment of the invention is described in connection with an oil- or fat-soluble vitamin-bearing oil, whereby the product will contain the oil- or fat-soluble vitamin in conjunction with the water-soluble (oil-insoluble) and preferably acid vitamin. If the product is to be one in which the oil- or fat-soluble vitamin is not desired, then the oil containing it may be omitted, and when so omitted there is employed a liquid vehicle, such as an oil, which is non-toxic, edible, insoluble in water, and which can be emulsified in the gelatin solution. The dry acid vitamin and dry alkaline substance are suspended in said liquid vehicle in the manner described in connection with the oil bearing the oil-soluble vitamin. The procedure for making the product is the same as those hereinbefore described. Where the liquid vehicle functions merely as a carrier, then only such a quantity thereof is used as to permit the incorporation of the acid vitamins and alkaline substance in the gelatin solution, under the conditions hereinbefore stated. On the other hand, where the liquid vehicle also imparts some desired properties (therapeutic or otherwise) to the product, then such an amount thereof should be used as will impart said properties to the product.

In order to more fully explain the invention, the following specific examples are set forth:

Example 1

A selected quantity of pure gelatin is first swollen in an appropriate quantity of water and thereafter dissolved therein while the temperature is brought to approximately 50° to 80° C. An appropriate quantity of plasticizer, if desired, is added with stirring and the mixture stirred until it is a homogeneous solution. This solution is a viscous liquid at a temperature of 50° to 80° C. and will assume the consistency of a firm gel if the temperature drops below 35° C. This solution has a pH of 4.7 and the proportion of the constituents thereof is as set forth in United States Patent No. 2,218,592.

8 parts of ascorbic acid, 1.34 parts of dry calcium hydroxide and 38.5 parts of fish liver oil containing vitamins A and D are placed in a mortar and there ground and thoroughly mixed until an oil suspension of the calcium hydroxide and ascorbic acid is obtained.

While the suspension prepared in the paragraph immediately preceding is continuously agitated, it is injected into an emulsion with 54 parts of the gelatin solution previously described. The resulting polyphase emulsion has a pH of 4.40.

The polyphase emulsion prepared as above described is formed into the desired shapes and forms which are subsequently dried by any of the procedures hereinbefore set forth.

Example 2

A selected quantity of pure gelatin is first swollen in an appropriate quantity of water and thereafter dissolved therein while the temperature is brought to approximately 50° to 80° C. An appropriate quantity of plasticizer, if desired, is added with stirring and the mixture stirred until it is a homogeneous solution. This solution is a viscous liquid at a temperature of 50° to 80° C. and will assume the consistency of a firm gel if the temperature drops below 35° C. This solution has a pH of 4.7 and the proportion of the constituents thereof is as set forth in United States Patent No. 2,218,592.

8 parts of ascorbic acid, 1.1 parts of dry calcium hydroxide and 38.5 parts of fish liver oil containing vitamins A and D are placed in a mortar and there ground and thoroughly mixed until an oil suspension of the calcium hydroxide and ascorbic acid is obtained.

While the suspension prepared in the paragraph immediately preceding is continuously agitated, it is injected into an emulsion with 54 parts of the gelatin solution previously described. The resulting polyphase emulsion has a pH of 4.22.

The polyphase emulsion prepared as above described is formed into the desired unit shapes and forms, which are subsequently dried by any of the procedures hereinbefore set forth.

Example 3 (preferred procedure)

| Material | Weight (in grams) |
|---|---|
| Gelatin | 1,536 |
| Corn syrup | 2,304 |
| Water | 2,745 |

The above ingredients, in the proportions shown, and constituting the aqueous phase, were mixed thoroughly and allowed to stand for about 14 hours until the water and corn syrup were completely absorbed by the gelatin. This mixture was then heated in a water bath at 65° C. for two hours to melt it to a viscous liquid.

A 3,000 gram portion of the vitamin oil to be added to the above aqueous phase was then carefully weighed, and from the 3,000 grams of oil 600 grams were withdrawn which was ground and mixed thoroughly with 750 grams of dry ascorbic acid. This oil-ascorbic acid mixture was then emulsified with the aqueous phase. Another portion of 350 grams of oil was withdrawn from the remainder of the 3,000 gram lot, and this was ground and mixed thoroughly with 144 grams of dry calcium hydroxide, and the resulting mixture then emulsified with the aqueous phase. The remaining 2,050 grams of vitamin-bearing oil was then emulsified with the aqueous phase. Throughout the procedure, the temperature was maintained at 65° C.

The polyphase emulsion prepared as above described, and while at the elevated temperature, is formed into the desired shapes and forms, which are subsequently dried by any of the procedures hereinbefore set forth.

Example 4

A polyphase emulsion is prepared as set forth in Example 3. 18 grams of thiamine hydrochloride (vitamin B₁) and 3 grams of riboflavin (vitamin G) are dissolved in 65 cc. of oil and this aqueous solution emulsified in the polyphase emulsion made in accordance with Example 3.

The final resulting polyphase emulsion is formed into the desired shapes and forms, and subsequently dried by any of the procedures hereinbefore set forth.

In each of the examples, the proportions are by weight.

As is clear from the foregoing, one embodiment of the invention is a vitamin preparation which comprises a substantially dry gelable colloid matrix, preferably gelatin, with or without a plasticizer (for the purposes previously mentioned) having discrete particles of a non-aqueous dispersed phase completely imprisoned therein, the said vitamin preparation having an alkaline substance and a water-soluble solid and specifically an acid vitamin in an amount to produce effective results, the quantity of the alkaline substance being sufficient to produce a pH at which the gelling power of the colloid was not materially inhibited during the course of manufacture and the acid vitamin is stable.

Another embodiment of the product produced in accordance with the invention comprises a vitamin preparation containing both oil-soluble vitamins and water-soluble vitamins. Such a preparation comprises a gelable colloid, preferably gelatin, having discrete particles of an oil containing an oil-soluble vitamin dispersed therein and completely imprisoned thereby, the preparation also containing an alkaline substance and an acid vitamin, the quantity of alkaline substance being sufficient to produce a pH at which the gelling power of the colloid was not materially inhibited during the course of manufacture and the acid vitamin is stable.

The products made according to this invention may also include water-soluble vitamins selected from the class which consists of thiamine chloride, riboflavin, pyridoxine, and nicotinic acid amide.

The preparation may be, as hereinbefore set forth, of any desired form or shape. If the preparation is in the form of substantially dry, free-flowing shaped units, such as beadlets, pellets or tablets of any size and shape, they can be coated in the manner well understood and customary in the art.

Each of the products, when made in accordance with one embodiment of the instant invention, is characterized by a pH of from 3.5 and preferably to a pH of 4.8, though, if desired, the upper pH may be as high a pH as 6, as hereinbefore described.

In the claims, the terminology defining the water-soluble vitamin and the alkaline substance is to be construed as covering these components per se or chemically combined with each other.

Since it is obvious that various changes and modifications may be made in the above description without departing from the nature or spirit thereof, this invention is not restricted thereto except as set forth in the appended claims.

I claim:

1. A method of preparing a vitamin preparation which comprises suspending particles of a solid water-soluble acid vitamin and particles of a dry alkaline substance in a vitamin A-bearing liquid, emulsifying the resulting suspension in a warm aqueous solution containing gelatin to form an emulsion in which the aqueous solution constitutes the continuous phase and the gelatin is of a concentration which will gel upon cooling, the quantity of said alkaline substance being such as to produce in the final emulsion a pH of from 3.5 to 4.8, sub-dividing said emulsion into units of the desired shape, and causing said units to gel.

2. A method of preparing a vitamin preparation which comprises suspending particles of ascorbic acid and particles of a hydroxide of an alkaline earth metal in a vitamin A-bearing liquid, emulsifying the resulting suspension in a warm aqueous gelatin solution to form an emulsion in which the aqueous solution constitutes the continuous phase and the gelatin is of a concentration which will gel upon cooling, the quantity of said alkaline substance being such as to produce in the final emulsion a pH of between 3.5 and 4.8, sub-dividing said emulsion into units of the desired shape, and causing said units to gel.

3. A method of preparing a vitamin preparation which comprises suspending a solid water-soluble acid vitamin and particles of a dry alkaline substance in an oil containing an oil-soluble vitamin, emulsifying the resulting suspension in a warm aqueous gelatin solution to form an emulsion in which the aqueous solution constitutes the continuous phase and the gelatin is of a concentration which will gel upon cooling, the quantity of said alkaline substance being such as to produce in the final emulsion a pH of from 3.5 to 4.8, sub-dividing said emulsion into units of the desired shape, and causing said units to gel.

4. The method of preparing a vitamin preparation containing oil-soluble and oil-insoluble vitamins which comprises suspending particles of a solid water-soluble acid vitamin in an oil containing an oil-soluble vitamin, suspending particles of a dry alkaline substance in a separate portion of oil containing an oil-soluble vitamin, emulsifying the two resulting suspensions in a warm aqueous solution containing gelatin to form a polyphase emulsion, emulsifying in said polyphase emulsion a quantity of oil containing an oil-soluble vitamin sufficient to produce the desired proportion thereof in the final product, said aqueous solution constituting the continuous phase of the final polyphase emulsion and the gelatin is of a concentration which will gel upon cooling, the quantity of said alkaline substance being such as to produce a pH of from 3.5 to 4.8, sub-dividing said emulsion into units of the desired shape, and causing said units to gel.

5. The method of preparing a vitamin preparation containing oil-soluble and oil-insoluble vitamins which comprises suspending particles of solid ascorbic acid in an oil containing an oil-soluble vitamin, suspending particles of a dry alkaline substance in a separate portion of oil containing an oil-soluble vitamin, emulsifying the two resulting suspensions in a warm aqueous gelatin solution to form a polyphase emulsion, emulsifying in said polyphase emulsion a quantity of oil containing an oil-soluble vitamin sufficient to produce the desired proportion thereof in the final product, said aqueous solution constituting the continuous phase of the final polyphase emulsion and the gelatin is of a concentration which will gel on cooling, the quantity of said alkaline substance being such as to produce in the final polyphase emulsion a pH of from 3.5 to 4.8, sub-dividing said emulsion into units of the desired shape, and causing said units to gel.

6. The method of preparing a vitamin preparation containing oil-soluble and oil-insoluble vitamins which comprises suspending particles of a solid ascorbic acid in an oil containing an oil-soluble vitamin, suspending particles of a hydroxide of an alkaline earth metal in a separate portion of oil containing an oil-soluble vitamin, emulsifying the two resulting suspensions in a warm aqueous gelatin solution to form a polyphase emulsion, emulsifying in said polyphase emulsion a quantity of the oil containing an oil-soluble vitamin sufficient to produce the desired proportion thereof in the final product, said aqueous solution constituting the continuous phase of the final polyphase emulsion and the gelatin is of a concentration which will gel on cooling, the quantity of said hydroxide being such as to produce in the final polyphase emulsion a pH of from 3.5 to 4.8, subdividing said emulsion into units of the desired shape, and causing said units to gel.

7. A substantially dry vitamin preparation comprising a gelatin matrix having discrete particles of an oil containing an oil-soluble vitamin dispersed therein and completely imprisoned therein, said matrix also having incorporated therein a water-soluble acid vitamin and an alkaline substance, the vitamins being present in therapeutically significant amounts, said vitamin preparation having a pH of from 3.5 to 4.8.

8. A substantially dry vitamin preparation comprising a gelatin matrix having discrete particles of an oil containing an oil-soluble vitamin dispersed therein and completely imprisoned therein, said matrix also having incorporated therein ascorbic acid and an alkaline substance, the vitamins being present in therapeutically significant amounts, said vitamin preparation having a pH of from 3.5 to 4.8.

9. A substantially dry vitamin preparation comprising a gelatin matrix having discrete particles of an oil containing an oil-soluble vitamin dispersed therein and completely imprisoned therein, said matrix also having incorporated therein a water-soluble acid vitamin and a hydroxide of an alkaline earth metal, the vitamins being present in therapeutically significant amounts, said vitamin preparation having a pH of from 3.5 to 4.8.

10. A substantially dry vitamin preparation comprising a gelatin matrix having discrete particles of an oil containing an oil-soluble vitamin dispersed therein and completely imprisoned therein, said matrix also having incorporated therein ascorbic acid and a hydroxide of an alkaline earth metal, the vitamins being present in therapeutically significant amounts, said vitamin preparation having a pH of from 3.5 to 4.8.

11. A substantially dry vitamin preparation comprising a gelatin matrix having discrete particles of vitamin A dispersed therein and completely imprisoned therein, said matrix also having incorporated therein a water-soluble acid vitamin and an alkaline substance, the vitamins being present in therapeutically significant amounts, said vitamin preparation having a pH of from 3.5 to 4.8.

12. A substantially dry vitamin preparation comprising a gelatin matrix having discrete particles of vitamin A dispersed therein and completely imprisoned therein, said matrix also having incorporated therein ascorbic acid and an alkaline substance, the vitamins being present in therapeutically significant amounts, said vitamin preparation having a pH of from 3.5 to 4.8.

13. A substantially dry vitamin preparation comprising a gelatin matrix having discrete particles of vitamin A dispersed therein and completely imprisoned therein, said matrix also having incorporated therein a water-soluble acid vitamin and a hydroxide of an alkaline earth metal, the vitamins being present in therapeutically significant amounts, said vitamin preparation having a pH of from 3.5 to 4.8.

14. A substantially dry vitamin preparation comprising a gelatin matrix having discrete particles of vitamin A dispersed therein and completely imprisoned therein, said matrix also having incorporated therein ascorbic acid and a hydroxide of an alkaline earth metal, the vitamins being present in therapeutically significant amounts, said vitamin preparation having a pH of from 3.5 to 4.8.

HARDEN F. TAYLOR.